United States Patent
Leglaye et al.

(10) Patent No.: US 9,995,219 B2
(45) Date of Patent: Jun. 12, 2018

(54) TURBINE ENGINE WALL HAVING AT LEAST SOME COOLING ORIFICES THAT ARE PLUGGED

(71) Applicant: SNECMA, Paris (FR)

(72) Inventors: Francois Leglaye, Vaux le Penil (FR); Sylvain Oblaza, Lieusaint (FR); Patrick Lutz, Rubelles (FR)

(73) Assignee: SNECMA, Paris (FR)

( * ) Notice: Subject to any disclaimer, the term of this patent is extended or adjusted under 35 U.S.C. 154(b) by 439 days.

(21) Appl. No.: 14/716,020

(22) Filed: May 19, 2015

(65) Prior Publication Data

US 2015/0338103 A1    Nov. 26, 2015

(30) Foreign Application Priority Data

May 20, 2014  (FR) .................................. 14 54508

(51) Int. Cl.
*F02C 3/04* (2006.01)
*F02C 7/18* (2006.01)
(Continued)

(52) U.S. Cl.
CPC ............... *F02C 7/18* (2013.01); *F01D 5/186* (2013.01); *F02K 1/822* (2013.01); *F02K 9/40* (2013.01);
(Continued)

(58) Field of Classification Search
USPC .............. 60/805, 806, 757, 782, 728, 39.83, 60/39.091, 337; 415/115, 116
See application file for complete search history.

(56) References Cited

U.S. PATENT DOCUMENTS

| 4,896,510 A | 1/1990 | Foltz |
| 6,145,319 A | 11/2000 | Burns et al. |
| 8,057,181 B1 * | 11/2011 | Liang ...................... F01D 5/186 |
| | | 416/97 R |
| 9,617,859 B2 * | 4/2017 | Morgan ................... F01D 5/18 |

(Continued)

FOREIGN PATENT DOCUMENTS

| EP | 0 972 992 A2 | 1/2000 |
| EP | 2 586 983 A2 | 5/2013 |
| GB | 1 492 049 A | 11/1977 |

OTHER PUBLICATIONS

Search Report dated Nov. 18, 2015 in United Kingdom Patent Application No. 1508573.1.
(Continued)

*Primary Examiner* — Binh Q Tran
(74) *Attorney, Agent, or Firm* — Oblon, McClelland, Maier & Neustadt, L.L.P.

(57) ABSTRACT

A turbine engine wall having a cold side and a hot side and including a plurality of cooling orifices for enabling air flowing on the cold side of the wall to penetrate to the hot side at least some of the cooling orifices being plugged by a plugging material so as to define a minimum level of porosity for the wall corresponding to putting the turbine engine into service, and the plugged cooling orifices being suitable for being unplugged progressively throughout the lifetime of the turbine engine in order to define a maximum level of porosity for the wall corresponding to an end of lifetime for the turbine engine, the plugging being performed by alternating at least one of the following rows or lines: circumferential rows, axial rows, diagonal lines, so as to lie in the range one-third to one-half of the maximum porosity.

10 Claims, 3 Drawing Sheets

(51) Int. Cl.
    *F01D 5/18*     (2006.01)
    *F02K 1/82*     (2006.01)
    *F02K 9/40*     (2006.01)
    *F02K 9/64*     (2006.01)
    *F23R 3/00*     (2006.01)
    *F23R 3/04*     (2006.01)
    *F23R 3/06*     (2006.01)

(52) U.S. Cl.
    CPC ............... *F02K 9/64* (2013.01); *F23R 3/002* (2013.01); *F23R 3/04* (2013.01); *F23R 3/06* (2013.01); *F05D 2260/202* (2013.01); *F23R 2900/00019* (2013.01); *F23R 2900/03041* (2013.01); *F23R 2900/03042* (2013.01)

(56) References Cited

U.S. PATENT DOCUMENTS

| | | | |
|---|---|---|---|
| 9,664,111 B2* | 5/2017 | Bogue | F02C 7/12 |
| 9,708,915 B2* | 7/2017 | Barr | F01D 5/186 |
| 2004/0226682 A1 | 11/2004 | Ehrhard et al. | |
| 2007/0036942 A1* | 2/2007 | Steele | F01D 25/12 |
| | | | 428/131 |
| 2011/0011563 A1 | 1/2011 | Steele | |
| 2013/0104517 A1* | 5/2013 | Correia | F01D 5/18 |
| | | | 60/39.091 |

OTHER PUBLICATIONS

French Preliminary Search Report dated Oct. 29, 2014 in French Application 14 54508, filed on May 20, 2014 ( with English Translation of Categories of Cited Documents).

\* cited by examiner

TURBINE ENGINE WALL HAVING AT LEAST SOME COOLING ORIFICES THAT ARE PLUGGED

BACKGROUND OF THE INVENTION

The present invention relates to the general field of turbine engine walls that are cooled by multiple perforations. The invention relates more particularly to an annular shroud for a forward flow or a reverse flow combustion chamber, to a cooled annular nozzle wall cover, or to an annular jacket for protecting a reheat chamber.

Typically, in those various portions of a turbine engine, the wall in contact with hot gas is subjected to the high temperatures of the gas and is provided with multiple perforation orifices, that are generally inclined at an angle of 60° relative to the normal to the wall so as to enable air flowing outside the wall to penetrate to the inside of the wall and form films of cooling air along its hot side.

Unfortunately, in order to take account of the way thermal stresses increase as an engine ages, the number and the distribution of cooling orifices needs to be designed to provide the maximum level of porosity as required at the end of the lifetime of the engine.

As a result, firstly a new engine at the beginning of its lifetime has a level of porosity that is not optimized, so the maximum air flow rate then used for cooling the walls reduces the overall performance of the turbine engine, and secondly this additional cooling increases pollution by causing combustion products to congeal. Furthermore, when the multiple perforations used are of the gyratory type, thermal efficiency is close to 1 even though the materials used for the walls are capable of withstanding considerably higher temperatures without prejudicing the lifetime of the turbine engine.

OBJECT AND SUMMARY OF THE INVENTION

The present invention thus seeks to mitigate such drawbacks by proposing to optimize multiple perforation in order to remain with acceptable wall temperature levels while reducing the turbine flow rate as much as possible.

To this end, there is provided a turbine engine wall having a cold side and a hot side and including a plurality of cooling orifices for enabling air flowing on the cold side of said wall to penetrate to the hot side in order to form a film of cooling air along said wall, said cooling orifices being distributed in a plurality of circumferential rows that are axially spaced apart from one another and the axes of each of said cooling orifices being inclined at an angle of inclination θ relative to a normal N to said wall, at least some of said cooling orifices being plugged by a plugging material so as to define a minimum level of porosity for said wall corresponding to putting said turbine engine into service, and said plugged cooling orifices being suitable for being unplugged progressively throughout the lifetime of said turbine engine in order to define a maximum level of porosity for said wall corresponding to an end of lifetime for said turbine engine, the wall being characterized in that said plugging is performed by alternating at least one of the following rows or lines: circumferential rows, axial rows, diagonal lines, so as to lie in the range one-third to one-half of said maximum porosity.

Thus, a portion of the flow rate that is not used in the coolest zones because of this partial plugging is recovered to feed the hotter zones better. More particularly, when using gyratory multiple perforations, the head loss due to shear between the azimuth multiple-perforation jets and the axial main flow is reduced as is the quantity of unburned residue that is produced in the mixing layer.

Preferably, the transition from said minimum porosity to said maximum porosity takes place locally as a function of an increase in the temperature of said wall.

Advantageously, said plugging material is a metal alloy based on aluminum or on brass having a melting temperature lying in the range 650° C. to 800° C. It may be applied by metal plating or in the form of a paste that sets, or in the form of a paint.

The present invention also provides a combustion chamber, a cooled nozzle, and a reheat jacket, and more generally any turbine engine including at least one wall as defined above.

BRIEF DESCRIPTION OF THE DRAWINGS

Other characteristics and advantages of the present invention appear from the following description made with reference to the accompanying drawings, which show an embodiment having no limiting character. In the figures.

DETAILED DESCRIPTION OF THE INVENTION

Figure 1:
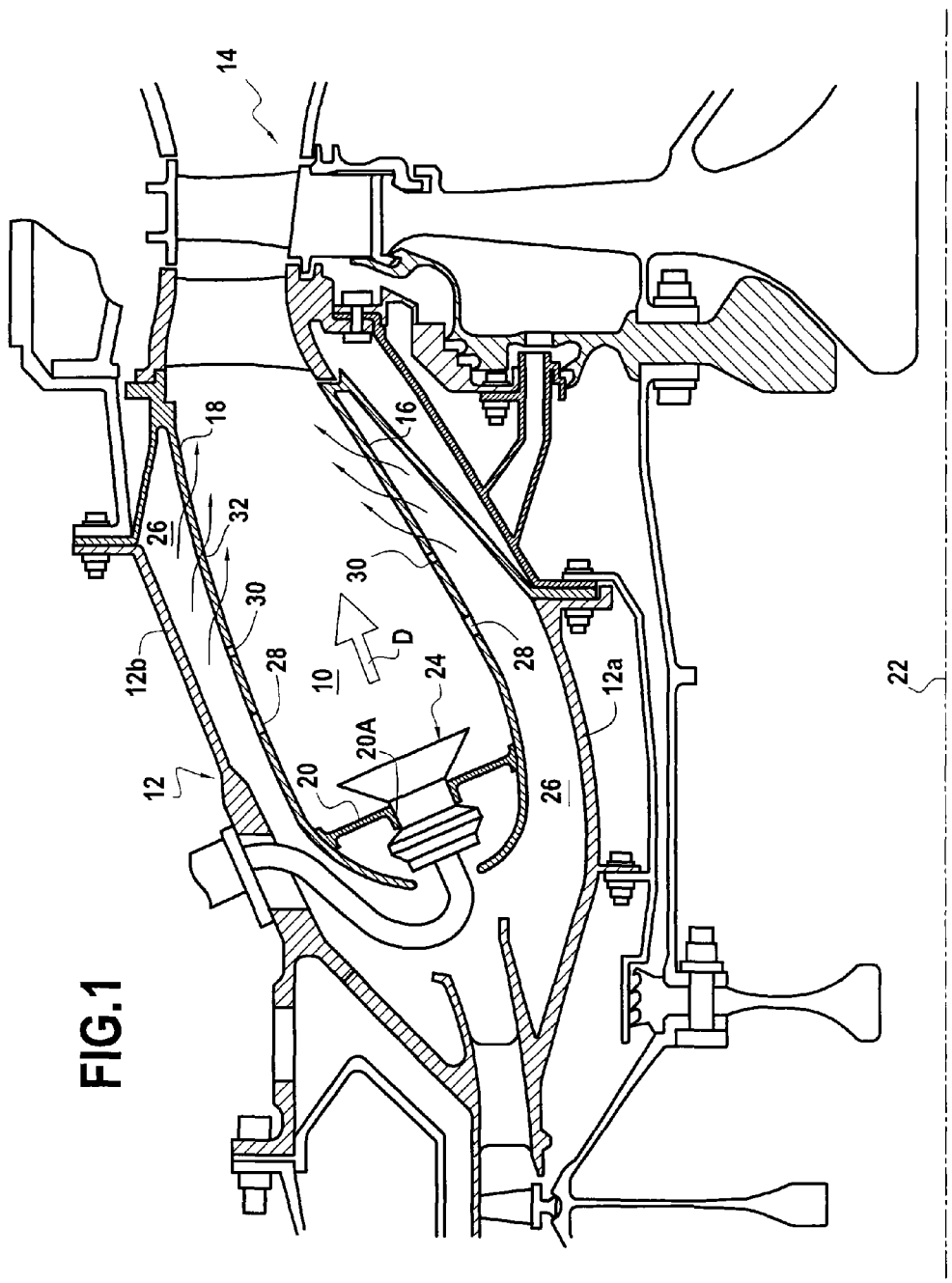
FIG. 1 is a longitudinal section view of a turbine engine combustion chamber in its environment.
Figure 2:
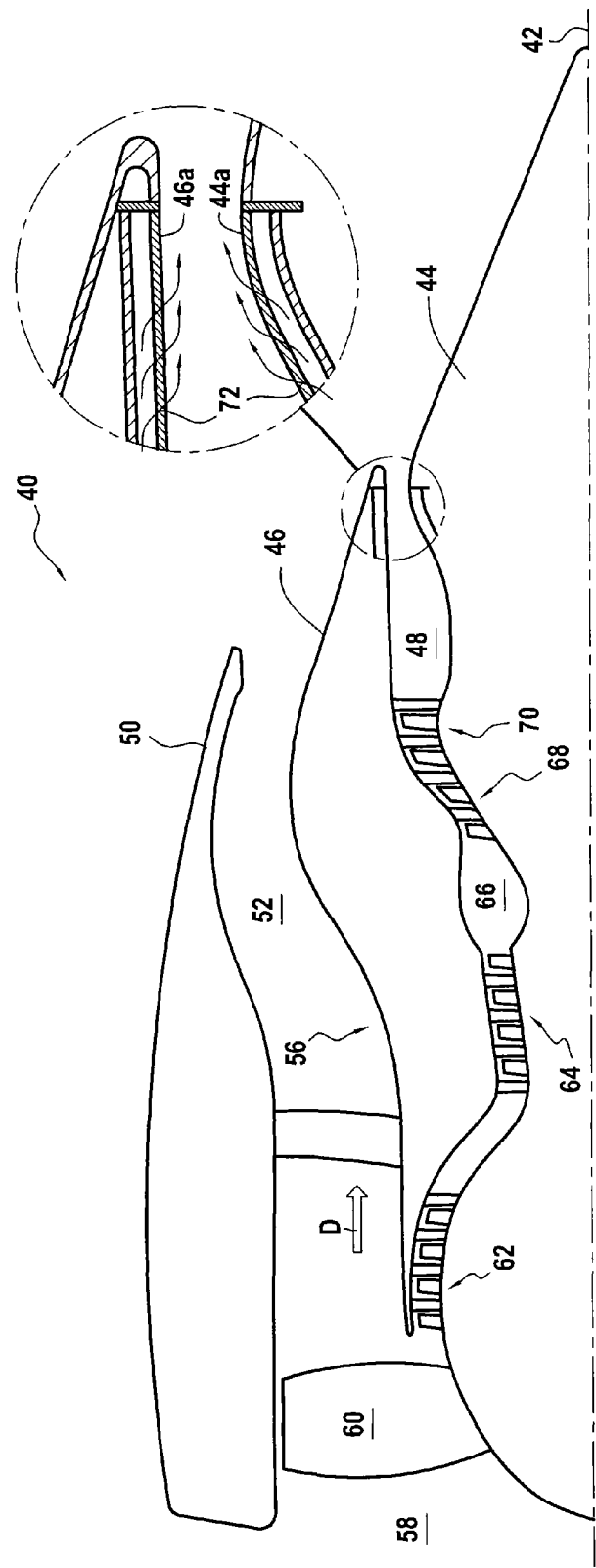
FIG. 2 is a longitudinal section view of a cooled turbine engine nozzle in its environment.

The invention applies to any type of turbine engine wall that is cooled by multiple perforations, and in particular it applies to the annular combustion chamber walls of a turbojet such as that shown in FIG. 1 or to the annular covers of cooled gas turbine nozzles in aeroengines, such as that shown in FIG. 2.

In FIG. 1, the combustion chamber 10 mounted in a chamber casing 12 is of annular type and the hot gas coming from this combustion chamber is directed to a high pressure turbine 14 arranged at its outlet. The combustion chamber is made up of an inner annular wall or shroud 16 and an outer annular wall or shroud 18 that are connected together upstream by a transverse wall 20 forming the chamber end wall. The combustion chamber may be a forward flow chamber as shown, or it may be a reverse flow chamber. Under such circumstances, a reversing bend is placed between the combustion chamber and the turbine nozzle.

The inner and outer annular walls 16 and 18 extend along a longitudinal axis that slopes slightly relative to the longitudinal axis 22 of the turbine engine. Each of them has a cold side facing towards the casing and a hot side facing towards the inside of the combustion chamber. The chamber end wall 20 is provided with a plurality of openings 20A have fuel injectors 24 mounted therein.

The chamber casing 12, which is made up of an inner jacket 12a and an outer jacket 12b, co-operates with the combustion chamber 10 to provide annular spaces 26 into which the compressed air for combustion is admitted (via primary holes 28), together with compressed air for dilution (via dilution holes 30 arranged downstream from the above-mentioned holes, where "downstream" should be understood relative to a generally axial direction of gas flow coming from the combustion of the air and fuel mixture inside the combustion chamber, and represented by arrow D), and compressed air for cooling the chamber (via a plurality of cooling orifices 32).

These orifices 32, which serve to cool the walls 16 and 18 via multiple perforation, are distributed in a plurality of circumferential rows that are axially spaced apart from one another and they cover substantially the entire surface area of the annular walls of the combustion chamber 10. They generally present an angle of inclination θ relative to a normal N to the annular wall 16, 18 through which they are pierced. This angle of inclination θ enables the air passing through these orifices to form a film of air along the hot side of the annular wall. Compared with orifices that are not inclined, they serve to increase the surface area of the annular wall that is cooled. In addition, the angle of inclination θ of the cooling orifices 32 is directed in such a manner that the film of air as formed in this way flows in the flow direction of the combustion gas inside the chamber (represented by arrow D). The number and the diameter d of the cooling orifices in each of the rows are identical. The pitch p between two orifices in a given row is constant and is optionally identical for all of the rows. Furthermore, adjacent rows of cooling orifices are arranged in such a manner that the orifices 32 are in a staggered configuration.

By way of example, for an annular wall 16, 18 made of metallic or ceramic material and having thickness lying in the range 0.6 millimeters (mm) to 3.5 mm, the diameter d of the cooling orifices 32 may lie in the range 0.3 mm to 1 mm, the pitch p may lie in the range 1 mm to 10 mm, and the angle of inclination θ may lie in the range +30° C. to +70° C., typically being +60°.

In FIG. 2, the cooled nozzle 40 for ejecting hot gas from a bypass turbojet and made up of a gas turbine engine and an annular nacelle arranged coaxially around the engine, is made up of an annular central body 44 centered on the longitudinal axis of the turbojet, an annular primary cover 46 surrounding the central body coaxially so as to co-operate therewith to define a primary annular channel 48, and a secondary annular cover 50 surrounding the primary cover coaxially in order to co-operate therewith to define a secondary annular channel 52 that is coaxial with the primary channel.

It should also be observed that, going from upstream to downstream in the flow direction of the air stream passing through the turbojet, the engine 56 has an air inlet 58, a fan 60, a low pressure compressor 62, a high pressure compressor 64, a combustion chamber 66, a high pressure turbine 68, and a low pressure turbine 70, each of these elements being arranged along the longitudinal axis 42.

On the path of the hot gas, the nozzle is cooled by making use of multiple perforations in the annular primary cover 46 and in the annular central body 44 that together define the annular channel 48 through which the hot gas passes. More particularly, the hot side 44a, 46a facing towards the inside of the annular channel is provided with a plurality of cooling orifices 72 distributed in a plurality of circumferential rows that are axially spaced apart from one another and that cover substantially the entire surface area of the annular covers of the cooled nozzle 40. In general, they present an angle of inclination θ relative to a normal N to the annular cover 44, 46 through which they are pierced. This angle of inclination θ enables the air passing through these orifices to form a film of air flowing in the flow direction of the combustion gas along the hot side of the annular cover. The number and the diameter d of the cooling orifices are identical in each of the rows. The pitch p between two orifices in a given row is constant and may optionally be identical in all of the rows. Furthermore, adjacent rows of cooling orifices are arranged in such a manner that the orifices 72 are in a staggered configuration.

By way of example, for an annular cover made of a metallic or ceramic material and having thickness lying in the range 0.6 mm to 3.5 mm, the diameter d of the cooling orifices may lie in the range 0.3 mm to 2 mm, the pitch p may lie in the range 1 mm to 10 mm, and the angle of inclination θ may lie in the range +30° to +70°, and is typically +60°.

Figure 3A:
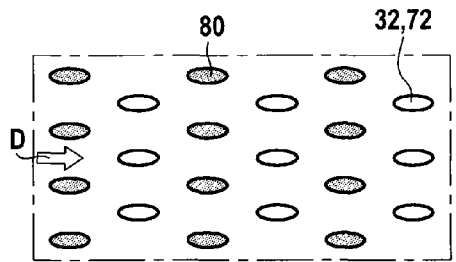
FIGS. 3a to 3c are fragmentary views of a portion of the annular wall of FIG. 1 or 2.
Figure 3B:
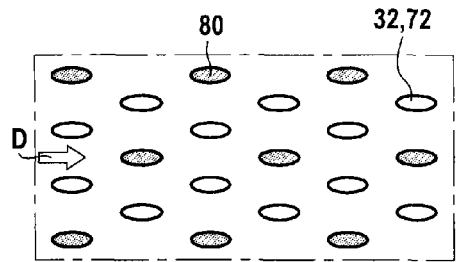
Figure 3C:
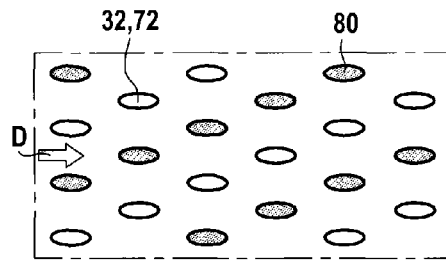

In the invention, and as shown in FIGS. 3a to 3c, each annular wall 16, 18 of the combustion chamber or each annular cover 44, 46 of the cooled nozzle has at least some of its cooling orifices 32, 72 plugged by a plugging material 80 that is preferably applied by metal plating, or in the form of a paste that sets, or in the form of a paint, so as to define a minimum level of porosity for the annular wall corresponding to the level needed for putting the turbine engine into service, with the cooling orifices that are plugged being unplugged progressively throughout the lifetime of the turbine engine so as to define a maximum level of porosity for the annular wall corresponding to the end of the lifetime of the turbine engine.

As a turbine engine ages, and in particular as the engine core ages, fuel consumption increases in order to maintain thrust, and as a result the temperature of the combustion chamber wall increases progressively. Thus, by way of example, downstream from the primary holes 28, the wall temperature of the combustion chamber 10 of an aeroengine may vary in the range 600° C. to 900° C. between first use on being fabricated and the end of its lifetime after about 15,000 operating cycles, and this implies a corresponding increase in the flow rate used for cooling the wall in order to ensure that the wall remains within acceptable temperature levels.

With the invention, it is thus possible by locally plugging the cooling orifices 32 (e.g. after six to ten rows adjacent to the upstream primary holes) to provide a cooling flow rate that is appropriate for a wall temperature of 600° C. while making provision for providing a cooling flow rate that is appropriate for a wall temperature of 900° C. once all of the orifices are unplugged. Between those extremes, the transition from the initial temperature corresponding to a minimum level of porosity for the wall (and to the minimum cooling flow rate) to the final temperature corresponding to its maximum level of porosity (and to the maximum cooling flow rate) takes place progressively as the temperature of the multiply-perforated wall increases.

For this purpose, the plugging material 80, which is in the form of a metal alloy based on aluminum or brass, possesses a melting temperature lying in the range 650° C. to 800° C. so as to enable the initially plugged cooling orifices to be unplugged progressively. The material melting enables hot zones to become unplugged in self-adaptive manner, with this taking place progressively during the life of the engine. The pressure difference between the cold side and the hot side of the wall is sufficient to expel the plugging material when it is in the molten state.

Depending on the positions of the cooling holes: upstream from the primary holes as explained above; between the primary holes and the dilution holes 30; downstream from the dilution holes; or indeed in the vicinity of the nozzle 14, it is possible for the plugging material to have a composition and a melting temperature that differs so as to cope with various flame temperature levels and differences (e.g. in the range 1000° C. to 2500° C. in the vicinity of the nozzle). Thus, the level of porosity of the wall is advantageously adapted locally rather than globally as a function of local temperature constraints, in order to ensure that temperature is uniform over the entire wall. The film effect provided by the multiple perforations continues to apply, but the walls adapt better to the zones that are subjected to convective heating or to radiant heating.

In practice, plugging may apply in the range one-third to one-half of the desired maximum level of porosity and it may then be performed in simple manner by alternating circumferential rows, as shown in FIG. 3a (for an initial level of porosity of one-half), or axial rows, as shown in FIG. 3b (for an initial level of porosity of one-third), or by alternating diagonal lines as shown in FIG. 3c (for an initial level of porosity of one-half). Naturally, where necessary, and in particular around singular points such as the dilution holes, it is possible to provide finer local adaptation involving individual cooling holes and not merely involving entire rows.

It should be observed that the invention is particularly adapted to multiple perforations with an offset of 90° relative to the longitudinal axis, also known as gyratory multiple perforations. Unlike the above-described axial cooling orifices shown in FIGS. 3a to 3c, which deliver an air film that flows in the axial direction D, the air film delivered by gyratory cooling orifices, as shown in FIGS. 4a to 4c, flows in a perpendicular direction because of their arrangement in a plane perpendicular to the axial direction D in which the hot gas flows.

These gyratory multiple perforations formed perpendicularly to the longitudinal axis of the turbine engine serve to improve the efficiency of air/fuel mixing and also to improve the mean temperature profile at the outlet from the chamber. Nevertheless, they also present drawbacks because unburned residues remain in the mixing layer, constraints due to separation and distortion due to a large amount of swirl, and head loss due to shear between the multiple perforation jets and the main axial flow. Such gyratory multiple perforations are more particularly an impediment at the inlet to the turbine nozzle because of the presence of non-axial speed components for which the profiles of the nozzle vanes are not designed. Consequently, the use of gyratory multiple perforations is generally restricted in combustion chambers and is not applied globally to the inner and outer walls of combustion chambers.

In contrast, the invention makes it possible to conserve the benefit of gyratory multiple perforations without the major drawbacks of generating turbulence, pollution, head loss, and flow rate consumption. In the vicinity of the nozzle, it is thus possible to recover a portion of the flow rate in order to improve its cooling.

Figure 4A:
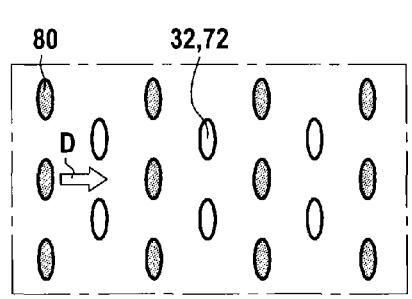
FIGS. 4a to 4c are fragmentary views of another portion of the annular wall of FIG. 1 or 2.
Figure 4B:
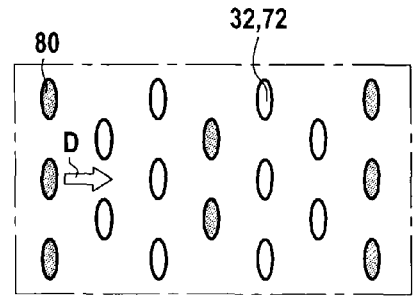
Figure 4C:
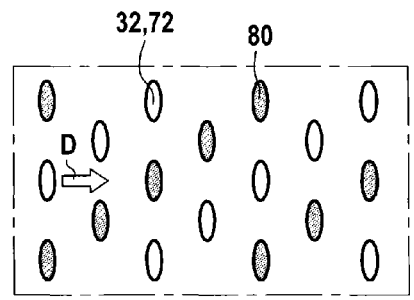

As with axial multiple perforations, plugging in gyratory multiple perforations may relate to a level of porosity lying in the range one-third to one-half of the desired level of porosity and may be achieved simply by alternating circumferential rows, as shown in FIG. 4a (for an initial level of porosity of one-half), or FIG. 4b (for an initial level of porosity of one-third), or by alternating diagonal lines as shown in FIG. 4c (for an initial level of porosity of one-half). Naturally, it is possible to make use of alternating axial rows or indeed of finer local adaptation involving individual cooling holes and not merely entire rows.

Thus, the invention makes the following possible, in particular:

to adapt the level of porosity of multiply-perforated walls to heating and radiation constraints;

to achieve a wall temperature that is more uniform, thereby reducing gradients that are constraining in terms of lifetime;

to reduce the congealing of pollutants in the mixing film of the multiple perforation;

when cooling a combustion chamber, to reduce the generation of turbulence at the inlet to the nozzle;

to recover flow rate so as to achieve better cooling of the nozzle and so as to reduce pollutants in the injection system;

to be compatible with already-existing turbine technology; and when cooling a nozzle, to recover a portion of thrust efficiency, and when cooling a reheat chamber, extend its lifetime.

The invention claimed is:

1. A turbine engine multiple-perforated wall having a cold side and a hot side, the perforated wall being an annular wall extending along an axis and comprising a plurality of cooling orifices for enabling air flowing on the cold side of said multiple-perforated wall to penetrate to the hot side in order to form a film of cooling air along said multiple-perforated wall, said cooling orifices being distributed in a plurality of circumferential rows that are axially spaced apart from one another and the axes of each of said cooling orifices being inclined at an angle of inclination relative to a normal to said multiple-perforated wall,
   wherein, at a first operating condition of the turbine engine, at least some of said cooling orifices being plugged by a plugging material so as to define a minimum level of porosity for said multiple-perforated wall corresponding to putting said turbine engine into service, said plugged cooling orifices being suitable for being unplugged progressively throughout a lifetime of said turbine engine, and a second operating condition of the turbine engine corresponding to an end of lifetime for the turbine engine, some of the plugged cooling orifices are unplugged to define a maximum level of porosity, and
   wherein, at the first operating condition of the turbine engine, said plugging is performed by alternating at least one of the following rows or lines: circumferential rows, axial rows, diagonal lines, so as to lie in the range one-third to one-half of said maximum porosity.

2. The wall according to claim 1, wherein the transition from said minimum porosity to said maximum porosity takes place locally as a function of an increase in the temperature of said multiple-perforated wall.

3. The wall according to claim 1, wherein said plugging material is a metal alloy based on aluminum or on brass having a melting temperature lying in the range 650° C. to 800° C.

4. The wall according to claim 3, wherein said plugging material is applied by metal plating or in the form of a paste that sets, or in the form of a paint.

5. A turbine engine combustion chamber comprising at least one wall according to claim 1.

6. A cooled turbine engine nozzle comprising at least one wall according to claim 1.

7. A turbine engine reheat chamber comprising at least one wall according to claim 1.

8. A turbine engine comprising a combustion chamber according to claim 5.

9. A turbine engine comprising a cooled nozzle according to claim 6.

10. A turbine engine comprising a reheat chamber according to claim 7.

* * * * *